May 12, 1970 K. D. WALLENTOWITZ ET AL 3,512,048
ELECTRONIC TIMER CIRCUIT
Filed March 3, 1967
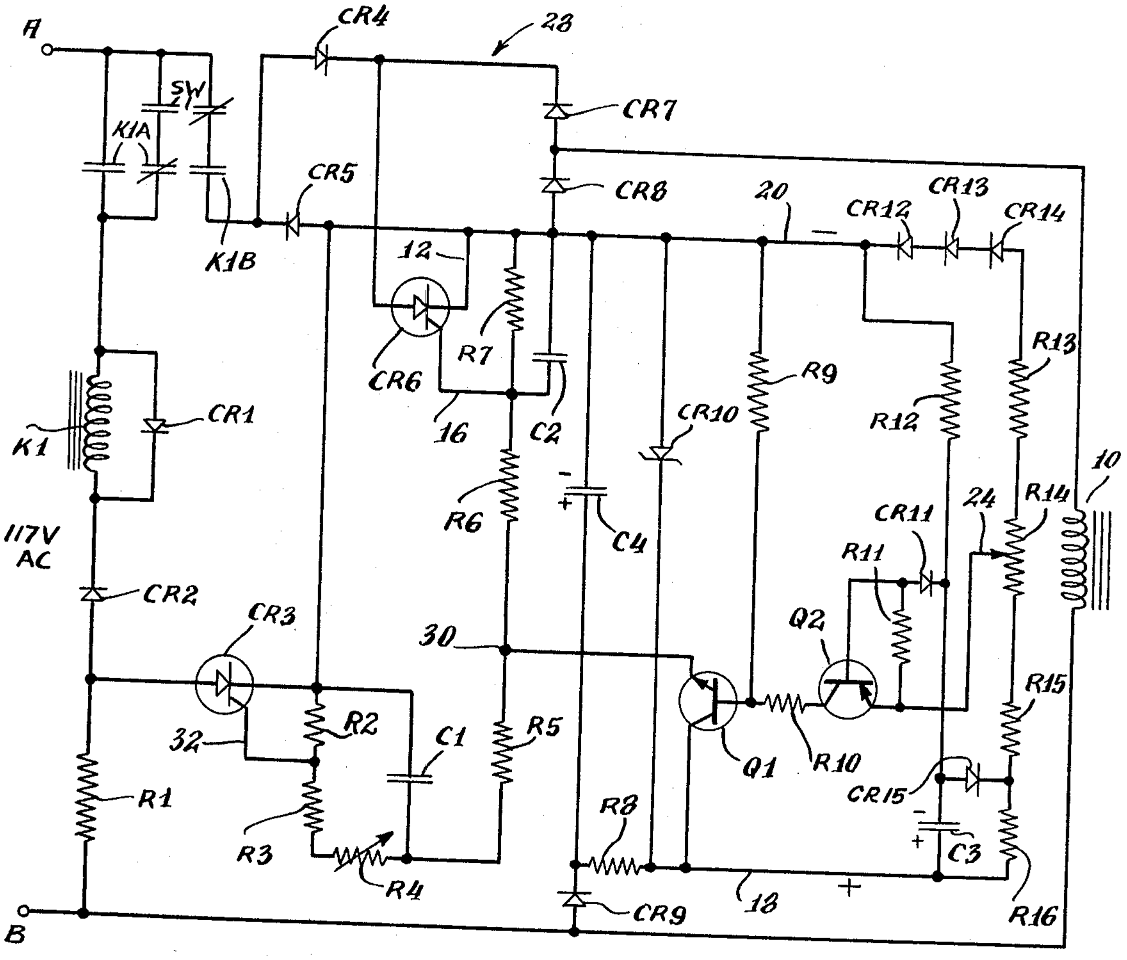
INVENTORS.
Klaus D. Wallentowitz
BY Robert S. Lundin
Mattern, Ware & Davis
ATTORNEYS.

United States Patent Office 3,512,048
Patented May 12, 1970

3,512,048
ELECTRONIC TIMER CIRCUIT
Klaus D. Wallentowitz, Waterbury, and Robert S. Lundin, Thomaston, Conn., assignors to General Time Corporation, Stamford, Conn., a corporation of Delaware
Filed Mar. 3, 1967, Ser. No. 620,543
Int. Cl. H01h 47/18; H03k 17/28, 17/56
U.S. Cl. 317—142 2 Claims

ABSTRACT OF THE DISCLOSURE

A multiple interval timer. A self-holding relay is initially energed upon transfer of a transfer switch. The timer is energized upon retransfer of the switch. At completion of the timer interval an output load is energized through an SCR-diode bridge circuit solid state alternating current relay. The signal that initiates conduction of the SCR is passed through a delay device. After a delay, it energizes a second SCR which shorts out the first relay through one leg of the bridge to discontinue energization of it and the load.

A novel direct current supply for the silicon-controlled rectifier of the solid state relay is derived from the same power line without the use of a transformer. A Zener diode is connected in parallel with a transistor and biasing resistors for controlling the gate of the SCR and insures that over voltages are not applied either to the SCR or to the transistor. The electronic timer derives its DC power from across the Zener diode. The timer comprises a resistor-capacitor bridge charging circuit having a transistor detector connected across it. A diode is connected intermediate of one arm of the bridge and to the capacitor for precharging the capacitor on initiation of a timing function. A diode is connected in series with the transistor junction to protect it against reverse bias. A plurality of diodes are incorporated into one arm of the bridge circuit and compensate for the temperature dependence of the junction potentials of the previously mentioned semiconductors.

It is an object of the present invention to provide an electronic timer powered by alternating current and providing switching at multiple intervals.

Another object of the invention is to provide an electronic timer of the above character that is completely solid state and transformerless.

Still another object of the invention is to provide an electronic timer of the above character employing a single electromechanical relay.

A further object of the invention is to provide an electronic timer of the above character providing a highly accurate secondary time base.

A still further object of the invention is to provide an electronic timer of the above character insensitive to variations in ambient temperature.

Another object of the invention is to provide an electronic timer of the above character utilizing a solid state alternating current relay for controlling a low impedance load.

Still another object of the invention is to provide an electronic timer of the above character employing a single direct current supply for controlling the alternating current relay and for powering the timer circuit.

Other objects of the invention will in part be obvious and will in part appear hereinafter.

The sole figure is a schematic diagram of an electronic timer circuit constructed in accordance with the present invention.

Referring to the drawing, the load 10 of the timer of the invention is a low impedance solenoid. When the switch SW is transferred, a circuit is completed through its normally open contacts and the normally closed relay contacts K1A to energize relay K1 with half-wave rectified alternating current as explained in the copending application of Robert S. Lundin, Ser. No. 589,335, filed October 25, 1966, now abandoned. Energization of relay K1 completes a holding path through the normally open contacts K1A to keep it energized. Simultaneously, contacts K1B close a circuit to supply power to the diode bridge, generally indicated at 28, through the normally closed contacts of switch SW when it is retransferred. DC power is then applied to the timing portion of the circuit from alternating current terminal B through diode CR9, resistor R8, Zener diode CR10 and diode CR5. The resulting fixed direct current potential between positive direct current bus 18 and negative bus 20 causes the bridge circuit timer to time out. The signal then supplied from transistor Q2 causes emitter follower transistor Q1 to conduct and the signal thus passes through resistors R6 and R7 to the gate 16 of SCR CR6. The load 10 is thus energized through SCR CR6 with full-wave alternating current power.

The signal from transistor Q1 is also supplied to a delay network formed of capacitor C1 and the associated resistors, R3 and R4 (R4 being adjustable to adjust the delay). After a predetermined delay, SCR CR3 is energized. Relay K1 is thereby shorted out by a path from terminal B through resistor R1, SCR CR3, diode CR5, relay contacts K1B, and switch SW, to terminal A. Relay K1 de-energizes, removing power from the bridge circuit 28 by opening the contacts K1B, de-energizing load 10.

The full-wave alternating current solid state relay of the timer circuit comprises four diodes, CR4, CR5, CR7 and CR8, connected into a bridge circuit 28 with SCR CR6 such that when the SCR conducts, full-wave alternating current is supplied to load 10. As will be understood by those skilled in the art, when load 10 is a low impedance, relatively high voltages may be applied between the cathode 12 of SCR CR6 and the alternating current terminal B. In an all solid state device, these high voltages, according to prior art, would break down the semiconductor switch Q1 controlling the gate 16 of the SCR CR6. This is avoided in the present invention by connecting Zener diode CR10 in series with resistor R8 and diode CR9, between the cathode 12 and the AC terminal B. Since the voltage across the Zener diode CR10 is fixed, most of the high voltage will appear resistor R8. The transistor Q1 and the SCR CR6 thus will be protected against over voltages. Capacitor C4 is the filter capacitor for this direct current supply.

Three compensating diodes, CR12, CR13 and CR14, are employed in the timer bridge circuit formed by resistors, R12, R13, R15 and R16, potentiometer R14, and capacitor C3. As explained in the copending application of Klaus D. Wallentowitz, Ser. No. 616,370, filed Feb. 15, 1967, now Pat. 3,457,464, capacitor C3 is precharged through a diode CR15 at the beginning of a timing interval to a fixed low voltage to increase the timer accuracy. Transistor Q2 is connected across the bridge and detects the full charge on capacitor C3. The emitter to base junction of transistor Q2 is protected by diode CR11, connected in series with it. The three junctions of diodes CR11 and CR15, and the emitter to base junction of transistor Q2 act together to reduce the timing interval when the temperature increases. This occurs because each junction's intrinsic junction potential decreases upon rising temperature. Thus, an increase in temperature will increase the initial charge on capactitor C3 through diode CR15.

Similarly, the effect of temperature on diode CR11 and on the emitter to base junction of transistor Q2 causes transistor Q2 to conduct when capacitor C3 is charged to a lower value. Diodes CR12, CR13 and CR14 have the same temperature characteristics as the junctions of diodes CR11, CR15 and transistor Q2. Thus, increasing temperature reduces the voltage between negative direct current bus 20 and terminal 24 of potentiometer R14. This means that transistor Q2 will not conduct until capacitor C3 is charged to a higher value than if diodes C12, C13 and C14 were not present. The two effects are opposite each other and substantially cancel so that the timer thus formed is substantially insensitive to temperature variations.

More specifically described in order that it may be energized with half-wave rectified alternating current, relay K1 has a diode CR1 connected thereacross for self-energization during the negative half cycles of the power line. During the positive half cycles, it is supplied with power through diode CR2. Resistor R1 limits the current between terminals A and B when relay K1 is shorted out by SCR CR3 and diode CR5. As previously stated, when switch SW is transferred, closing its normally open contacts, relay K1 energizes. Other loads may also be energized by transfer of the switch SW and relay K1 may have other load-controlling contacts. When switch SW is returned to its normal position, relay K1 remains energized through its normally open holding contacts K1A and the normally closed contacts of switch SW. Additionally, power is now supplied through normally open relay contacts K1B to the timer portion of the circuit.

The SCR CR6 is initially in its OFF condition. However, one leg of the bridge 28 is used to supply power to the timer circuit via diodes CR9, resistor R8, Zener diode CR10 and diode CR5 of the bridge.

The DC voltage between buses 18 and 20 is limited to the breakdown potential of the Zener CR10. Capacitor C3 is precharged through diode CR15. Thereafter, it charges through resistor R12. The interval until detection, when transistor Q2 conducts, may be varied by adjusting potentiometer R14. When transistor Q2 conducts current flows from the positive bus through resistors R16, R15, the lower portion of potentiometer R14, the emitter and collector of transistor Q2, resistor R10 and resistor R9. The base of emitter follower transistor Q1 now becomes positive enough to cause it to conduct and this signal is supplied through resistors R6 and R7 to the gate 16 of SCR CR6. The SCR conducts, energizing the load 10.

The SCR gate 16 is biased to conduction by the voltage developed across resistor R7 when Q1 conducts and is protected against false triggering due to transients by capacitor C2. The signal supplied to terminal 30 from emitter follower Q1 charges capacitor C1 through resistor R5. The rate of charging capacitor C1 is adjusted by adjusting variable resistor R4. When the charge on capacitor C1 reaches a high enough value, the potential on the gate 32 of SCR CR3 becomes high enough to cause SCR CR3 to conduct. It will be noted that capacitor C1 furnishes transient protection to SCR CR3.

When SCR CR3 conducts, it shorts out relay K1 through register R1 and diode CR5, as previously described. Relay K1 de-energizes, opening its contacts K1B, discontinuing the power to the timer and to the load 10. Note that diode CR5 backbiases SCR CR3, as described in U.S. Pat. No. 3,417,297 of Klaus D. Wallentowitz, issued Dec. 17, 1968.

Capacitor C4 acts as the filter capacitor for the DC portion of the circuit.

An electronic timer for use in a photocopy machine utilizes the following components: Diodes CR1, CR2, CR4, CR5, CR7 and CR8 are each type DE200; diode CR9, type DE300; and diodes CR12, CR13 and CR14, each type DE50; all supplied by Semiconductor Products. SCRs CR3 and CR6 are each General Electric type C106B. Zener diode CR10 is a ZA30. Diode CR11 is a 1N461, as is diode CR15. Transistor Q1 is a 2N3705 and transistor Q2, a 2N4248. Capacitor C1 is a 10 microfarad, 25 volt capacitor; capacitor C2, 0.1 microfarad, 10 volt capacitor; capacitor C3 a 5 microfarad, 20 volt capacitor; and capacitor C4 a 10 microfarad, 200 volt electrolytic filter capacitor. Resistor R1 is a 1 kilohm, 2 watt resistor. Resistor R2 is a 1 kilohm, one-half watt resistor. Resistor R3 is a 33 kilohm, one-half watt resistor. Variable resistor R4 takes the form of a 10 kilohms, 2 watt potentiometer. Resistor R5 is 4.7 kilohms; resistor R6, 10 kilohms; resistor R7, 1 kilohm; resistor R9, 47 kilohms; resistor R10, 10 kilohms; resistor R11, 470 kilohms; resistor R12, 100 kilohms; resistor R13, 1 kilohm; resistor R15, 500 ohms; resistor R16, 680 ohms; all rated at one-half watt. Resistor R8 is a 3.9 kilohm, 5 watt resistor. Potentiometer R14 is a 1 kilohm, one-half watt potentiometer. Relay K1 is a 117 volt alternating current relay and the load 10 is a 10 watt alternating current solenoid.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. An electronic timer for connection to an A.-C. supply line for timing the energization of a load comprising, in combination, a relay having an output circuit and a sealing-in circuit, means including a manually operable momentary type switch for turning on the relay, a regulated D.-C. supply including a rectifier energized by the relay output circuit, a first electronic timing circuit having a first R-C network energized by the D.-C. supply and having a first solid state output switching element for coupling the load to the relay output circuit to initiate operation of the load following a first timed interval, a second electronic timing circuit connected for triggering by the first timing circuit at the end of the first timed interval, the second electronic timing circuit having a second R-C network supplied by the D.-C. supply and having a second solid state output switching element connected for dropping out of the relay so that operation of the load is terminated following the second timed interval.

2. An electronic timer according to claim 1 in which the output switching elements are in the form of silicon controlled rectifiers and in which the output switching element of the second timing circuit is connected in shunt with the relay for effectively shorting out the relay to produce dropout thereof to define the end of the second timed interval.

References Cited

UNITED STATES PATENTS

| | | | |
|---|---|---|---|
| 3,142,004 | 7/1964 | Culbertson | 317—142 |
| 3,249,821 | 5/1966 | Shillington | 317—142 |
| 3,325,657 | 6/1967 | Corey | 307—132 |

LEE T. HIX, Primary Examiner

C. L. YATES, Assistant Examiner

U.S. Cl. X.R.

307—252, 293